(12) United States Patent
Marcu (10) Patent No.: US 7,626,614 B1
(45) Date of Patent: Dec. 1, 2009

(54) TRANSFER FUNCTION AND HIGH DYNAMIC RANGE IMAGES

(75) Inventor: Gabriel G. Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 563 days.

(21) Appl. No.: 11/058,770

(22) Filed: Feb. 15, 2005

(51) Int. Cl.
*H04N 5/228* (2006.01)
*H04N 5/235* (2006.01)
*G06K 9/40* (2006.01)

(52) U.S. Cl. .............. 348/222.1; 348/362; 382/266

(58) Field of Classification Search ........... 348/298, 348/362, 222.1; 382/266; 358/228
See application file for complete search history.

(56) References Cited

U.S. PATENT DOCUMENTS

| | | | | |
|---|---|---|---|---|
| 5,264,940 A | * | 11/1993 | Komiya et al. | 348/298 |
| 5,818,977 A | * | 10/1998 | Tansley | 382/294 |
| 5,828,793 A | * | 10/1998 | Mann | 382/284 |
| 6,593,970 B1 | * | 7/2003 | Serizawa et al. | 348/362 |
| 6,825,884 B1 | * | 11/2004 | Horiuchi | 348/362 |
| 2001/0021276 A1 | * | 9/2001 | Zhou | 382/266 |
| 2003/0095192 A1 | * | 5/2003 | Horiuchi | 348/222.1 |

OTHER PUBLICATIONS

Papaul E. Debevee, et al. "Recovering High Dynamic Range Radiance Maps from Photographs". SIGGRAPH, p. 369-378. 1997.
Chiu, K. et al. "Spatially Nonuniform Scaling Functions for High Contrast Images," *Proceedings of Graphics Interface '93*, pp. 245-244 (May 1993).
Durand, Fredo et al. "Fast Bilateral Filtering for the Display of High-Dynamic-Range Images," *SIGGRAPH* (2002).
Fairchild, Mark D. et al. "Image Appearance Modeling," *SPIE/IS&T Electronic Imaging* (2003).
Fairchild, Mark D. et al. "Meet iCAM: A Next-Generation Color Appearance Model," *IS&T/SID 10th Color Imaging Conference*, Scottsdale, Arizona, pp. 33-38 (2002).
Fairchild, Mark D. et al. "The iCAM Framework for Image Appearance, Image Differences, and Image Quality," *Journal of Electronic Imaging* (2004).
Fattal, Raanan et al. "Gradient Domain High Dynamic Range Compression," *ACM Transactions on Graphics (Proc. ACM SIGGRAPH 2002)*, pp. 249-256 (Jul. 2002).
Johnson, Garrett M. et al. "Measuring Images: Differences, Quality, and Appearance," *SPIE/IS&T Electronic Imaging Conference*, Santa Clara, SPIE vol. 5007, pp. 51-60 (2003).

(Continued)

*Primary Examiner*—Nhan T Tran
*Assistant Examiner*—Trung Diep
(74) *Attorney, Agent, or Firm*—Blakely, Sokoloff, Taylor & Zafman LLP (57) ABSTRACT

Methods and apparatuses to derive at least one exposure function for high dynamic range imaging from images of different exposure durations. In one aspect, a method to generate a high dynamic range image from a plurality of images taken with a plurality of exposure durations respectively, includes: computing an exposure function from the plurality of images; and combining the plurality of images into a high dynamic range (HDR) image using the exposure function. In one example of an embodiment, the exposure function is evaluated through: evaluating first data representing a derivative of the exposure function from pixel values of the plurality of images; and integrating the first data to generate second data representing the exposure function.

34 Claims, 6 Drawing Sheets

OTHER PUBLICATIONS

Johnson, Garrett M. et al. "Rendering HDR Images," *IS&T/SID 11th Color Imaging Conference*, Scotsdale, Arizona, pp. 36-41 (2003).

Kimmel, Ron et al. "A Variational Framework for Retinex," *SPIE Electronic Imaging*, San Jose, CA, vol. 4672 (Jan. 2002).

Larson, Gregory W. et al. "A Visibility Matching Tone Reproduction Operator for High Dynamic Range Scenes," *IEEE Transactions on Visualization and Computer Graphics*, 3(4):291-306 (Oct.-Dec. 1997).

Meylan, Laurence, et al. "Bio-inspired Color Image Enhancement," *IS&T/SPIE Electronic Imaging 2004: Human Vision and Electronic Imaging IX*, vol. 5292 (Jan. 2004).

Moroney, Nathan et al. "Comparison of Retinex and iCAM for Scene Rendering," *Journal of Electronic Imaging*, 13(1):139-145 (Jan. 2004).

OpenEXR. "Using EXRdisplay: Revealing More Detail in OpenEXR Images," www.openexr.org. (Nov. 2004).

Pattanaik, Sumanta N. et al. "Multiscale Model of Adaptation, Spatial Vision and Color Appearance," *Proceedings of the Sixth Color Imaging Conference, Society for Image Science and Technology* (Nov. 1998).

Reinhard, Erik et al. "Photographic Tone Reproduction for Digital Images," *ACM Transactions on Graphics (Proc. of SIGGRAPH 2002)*, 21(3) (Jul. 2002).

* cited by examiner

TRANSFER FUNCTION AND HIGH DYNAMIC RANGE IMAGES

TECHNOLOGY FIELD

At least some embodiments of the present invention relate to high dynamic range imaging, and more particular to transfer functions, which can be used to generate high dynamic range images from series of images with different exposure durations.

BACKGROUND

Dynamic range shows the ratio of a specified maximum level of a parameter to the minimum detectable value of that parameter. High dynamic range imaging allows a greater dynamic range of exposures than normal digital imaging techniques. For example, a high dynamic range image can accurately represent the wide range of intensity levels found in real scenes, ranging from direct sunlight to the dark shadows. In a normal digital imaging technique, either the dark region or the bright region becomes saturated, or almost saturated, so that the details in these regions become unrecognizable.

Typically, a digital camera has a limited dynamic range. With a given exposure setting, the digital camera may not be able to capture the details in a bright area in the scene, since the bright area in the picture taken by the digital camera is saturated and represented as a uniform white region. Similarly, the details in a dark area in the scene may be captured as a uniform black region. Increasing the exposure duration may allow the camera to capture more details in the dark region but lose more details near the bright region as the bright region expands. Reducing the exposure duration may allow the camera to capture more details in the bright region but lose more details near the dark region as the dark region expands.

Paul E. Debevec and Jitendar Malik (Recovering high dynamic range radiance maps from photographs, Proc. of SIGGRAPH 97, Computer Graphics Proceedings, Annual Conference Series, pp. 369-378, 1997), presents a method to derive a response curve that relates the pixel image values and the natural logarithm of the product of irradiance and exposure duration. The response curve then can be used to recover high dynamic range radiance maps from series of images of a same scene taken at different exposure levels. In one example, Paul E. Debevec and Jitendar Malik map the logarithm of the radiance values into a gray scale image, which presents all the information in the series of images taken at the different exposure levels.

To obtain the response curve, Paul E. Debevec and Jitendar Malik formulated a quadratic objective function for least square minimization. The minimization process is formulated to solve for both the response curve and for the irradiances involved simultaneously. The quadratic objective function involves the second derivative of the response curve in order to obtain a smooth response curve.

SUMMARY OF THE DESCRIPTION

Methods and apparatuses to derive at least one exposure function for high dynamic range imaging from images of different exposure durations are described here.

In one aspect of the present invention, a method to generate a high dynamic range image from a plurality of images taken with a plurality of exposure durations respectively, includes: computing an exposure function from the plurality of images; and combining the plurality of images into a high dynamic range (HDR) image using the exposure function. An HDR image may be considered to be an image having a range of luminance (or other color intensity value or a combination of such values) which is greater than the average range of a plurality of images (and usually the HDR image has a range which is greater than the range of any image in the plurality of images which was used to created the HDR image).

In one example of an embodiment, the exposure function is automatically evaluated through: evaluating first data representing a derivative of the exposure function from pixel values of the plurality of images; and integrating the first data to generate second data representing the exposure function.

In one example of an embodiment, for the images the exposure function indicates variation in exposure with respect to pixel value level produced at corresponding exposure.

In one example of an embodiment, the plurality of images is combined into the high dynamic range (HDR) image through: averaging data representing irradiance evaluated according to the pixel values of the plurality of images and the second data. In one example, the data representing irradiance is averaged using weight based on the pixel values; and the weight is larger for pixel values closer to saturated pixel values than for pixel values away from the saturated pixel values.

In one example of an embodiment, the first data representing the derivative of the exposure function is evaluated through: computing the first data from data representing a derivative of logarithm of exposure duration with respect to pixel value for one or more pixels in a region receiving substantially constant irradiance in the plurality of images.

In one example of an embodiment, the one or more pixels include a contiguous block of pixels. In one example, the block of pixels has pixel values within a tolerant threshold from an average of pixel values of the block of pixels.

In one example of an embodiment, evaluating the first data representing the derivative of the exposure function includes evaluating a rate of change in logarithm of exposure duration over change in pixel value one or more pixels representing a region receiving substantially constant irradiance in the plurality of images.

Thus, a machine readable medium includes any mechanism that provides (i.e., stores) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.).

In one example of an embodiment, the exposure function is evaluated from pixel values for one of: a red channel; a green channel; and a blue channel. In another example, the exposure function is evaluated from pixel values for a gray level.

The present invention includes methods and apparatuses that perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least certain embodiments described herein provide a method for obtaining a mathematical description of the behavior of an image capturing device such as a camera or scanner or the behavior of an image processing algorithm. The typical behavior which is described mathematically is an exposure function of an imaging process or device, such as camera or scanner. The exposure function usually describes the relationship between an inputted exposure level (which is inputted to the image capturing device) and the resulting output from the image capturing device.

Figure 3:
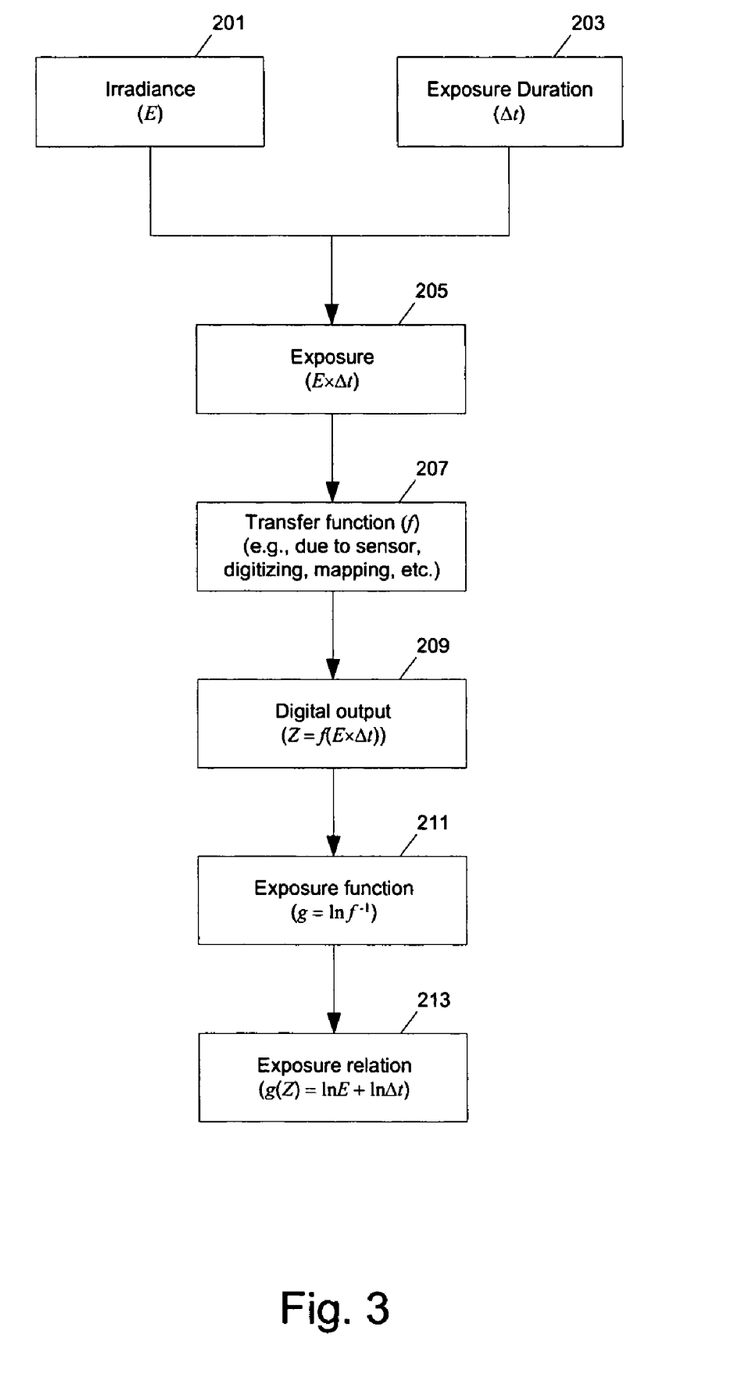
FIG. 3 illustrates a model of an imaging process which can be used with embodiments of the present invention.

FIG. 3 illustrates a model of an imaging process which can be used with embodiments of the present invention. In the model of FIG. 3, it is assumed that the exposure (205) at a pixel of an image is the product of irradiance E (201) and exposure duration $\Delta t$ (203). The exposure $E \times \Delta t$ (205) determines the digital output at the pixel of the image.

It is assumed that the exposure $E \times \Delta t$ and the digital output follow a transfer function f (207) for a set of images produced in a same process but with different exposure durations. A given level of exposure produces a corresponding level of digital output according to the transfer function. Since the different combination of irradiance E and exposure duration $\Delta t$ can have the same exposure, one can adjust the exposure duration $\Delta t$ so that for the given irradiance E of a portion of the scene the corresponding level of digital output is within the dynamic range of the camera. Since different portions of a scene may require different exposure durations, a set of images taken with different exposure durations can be used to derive irradiance distribution for the scene. The irradiance distribution can be used to derive a high dynamic range image at any given exposure duration.

In a digital camera, the nonlinear transfer function f (207) may include the nonlinear contributions from the physical characteristic of the imaging sensor, the digitizing process, mapping from sensed signals to image files, etc. In digital images scanned from films, the transfer function f (207) may include the physical characteristics of the film, the film develop process, the characteristics of the scanner, etc. In general, any nonlinear effect in the image generation process can be included in the nonlinear transfer function f (207).

Thus, the digital output (209) can be expressed as $Z=f(E \times \Delta t)$. When an exposure function g is the logarithm of the inverse of the transfer function (e.g., $g=\ln f^{-1}$) (211), the exposure relation (213) can be written as:

$$g(Z) = \ln E + \ln \Delta t$$

The exposure function g provides the logarithm level of exposure g(Z) that is required to generate a given digital output. Thus, it is seen that in a logarithm scale, the irradiance E and the exposure duration $\Delta t$ make the same type of contribution to the logarithm level of exposure g(Z). Thus, the change of the logarithm of the exposure with respect to the irradiation for the same exposure duration follows the same trend of the change of the logarithm of the digital output with respect to the exposure duration for the same irradiation.

In one embodiment of the present invention, it is recognized that the first derivative of the exposure function g(Z) can be expressed in the following way under the condition of constant irradiance. The first derivative of the exposure function g(Z) shows the change of the logarithm level of exposure g(Z) as a function of the digital output Z.

$$dg(Z)/dZ = d(\ln \Delta t)/dZ|_{E=Constant}$$

or $$g'(Z) = (d\Delta t/dZ)/\Delta t|_{E=Constant}$$

The change of the exposure can be due to the change in irradiance E or exposure duration $\Delta t$. When the irradiance E is held constant, changes in exposure can be achieved through the change in exposure duration. For example, for a given point in the scene, the irradiance can be assumed to be constant within a period of time. The logarithm of the exposure generated from using different exposure time for the same point in the scene as a function of the digital outputs provides a curve of exposure function. However, without measuring the irradiance E, the logarithm of the exposure cannot be computed directly. In a typically photograph process, the digital output Z and the exposure duration $\Delta t$ are known. Since the above expression shows that for the same irradiance E (e.g., the same point in the scene), the slope of the curve of the logarithm of exposure duration as a function of the digital output Z is the same as the slope of the curve of the exposure function. Thus, the slope of the exposure function, g'(z), can be determined from the data about digital output Z and exposure duration $\Delta t$ under the condition of constant irradiance E, without measuring irradiance E. Once the slope of the exposure curve is obtained, an integration process can be used to obtain the shape of the exposure curve.

Thus, in one embodiment of the present invention, the first derivative g' of the exposure function g is evaluated from the derivative of the exposure duration $\Delta t$ with respect to the pixel value Z under the condition of constant irradiance.

Once the first derivative g' of the exposure function g is obtained, the exposure function g can be computed from the integration of the first derivative g'.

Figure 4:
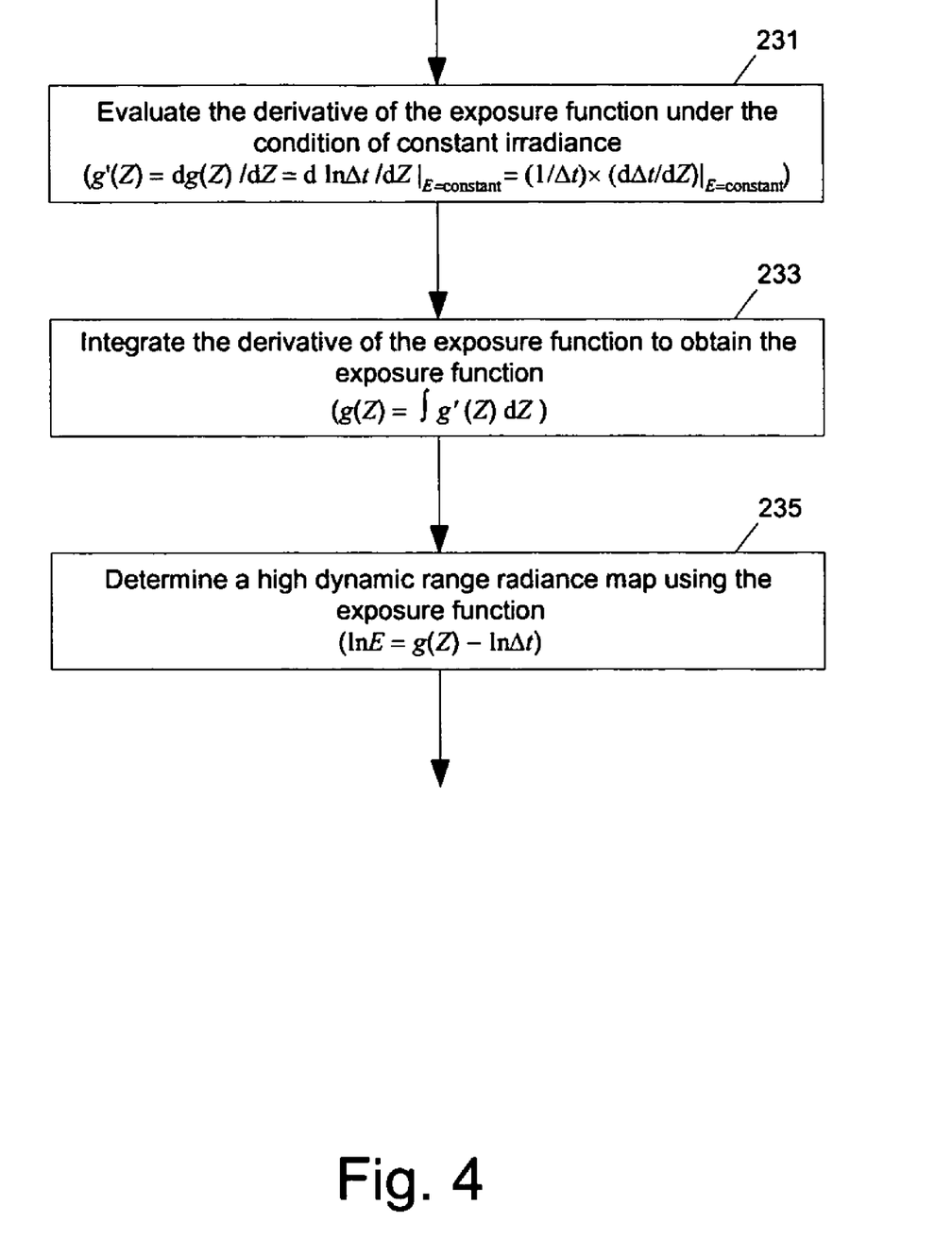
FIG. 4 illustrates a method to derive an exposure function according to one embodiment of the present invention.

FIG. 4 illustrates a method to derive an exposure function according to one embodiment of the present invention. The first derivative of the exposure function under the condition of constant irradiance is evaluated (231) from the known values of exposure durations and corresponding pixel values.

$$g'(Z)=dg(Z)/dZ=d(\ln \Delta t)/dZ|_{E=Constant}=(d\Delta t/dZ)/\Delta t|_{E=Constant}$$

For example, according to $g'(Z)=d(\ln \Delta t)/dZ|_{E=Constant}$, the slope of the exposure function as a function of the digital output can be evaluated from the slope of logarithm of the exposure duration as a function of the digital output for a constant irradiance E (e.g., a same point in the scene). Alternatively, according to $g'(Z)=(d\Delta t/dZ)/\Delta t|_{E=Constant}$, the slope of the exposure function as a function of the digital output can be evaluated from the slope of the exposure duration for a constant irradiance E (e.g., a same point in the scene) as a function of the digital output divided by the exposure duration.

In one embodiment, a pixel is assumed to have the same irradiance or substantially the same irradiance in different images of different exposure durations. It may be assumed that the set of images are taken in a time period sufficient short so that the irradiance for the pixels remains constant. The pixel in the set of images corresponds to a same area of the scene. Thus, for a pixel in the set of images, the change in exposure time ($\Delta t$) divided by the product of change in pixel value (dZ) and the exposure time ($\Delta t$) provides the first derivative of the exposure function. Alternatively, the logarithm of the exposure duration can be evaluated to compute the rate of the change in the logarithm of the exposure duration over the change in pixel value, which equals to the first derivative of the exposure function.

For example, consider that a pixel has a pixel value $Z_1$ in an image taken with an exposure duration $\Delta t_1$ and a pixel value $Z_2$ in another image taken with an exposure duration $\Delta t_2$. Using a finite difference scheme, the first derivative of the exposure function at $Z_x=(Z_1+Z_2)/2$ can be evaluated as:

$$g'(Z_x)=(\Delta t_1-\Delta t_2)/[(Z_1-Z_2)Z_x]$$

or $$g'(Z_x)=(\ln \Delta t_1-\ln \Delta t_2)/(Z_1-Z_2)$$

Thus, the slope of the exposure function at digital output $Z_x=(Z_1+Z_2)/2$ can be evaluated from the difference in the exposure durations divided by the produce of the digital output $Z_x$ and the difference in digital outputs produced by the same irradiance. Alternatively, the slope of the exposure function at digital output $Z_x=(Z_1+Z_2)/2$ can be evaluated from the difference in the logarithm of the exposure durations divided by the difference in the digital outputs produced by the same irradiance.

If more than two images are taken with different exposure durations, the first derivative of the exposure function can be evaluated at two or more points using the above expressions.

Pixels having different pixel values (Z) in a same image can be selected to obtain the first derivative of the exposure function at different pixel value levels. Thus, a set of data points for the first derivative of the exposure function can be evaluated over a range of pixel values (e.g., $g'(Z_1)$, $g'(Z_2)$, ..., $g'(Z_n)$).

In one embodiment, the derivative of the exposure function is integrated (233) to obtain the exposure function.

$$g(Z)=\int g'(Z)dZ$$

In general, integrating the first derivative of a function to compute the function involves an arbitrary integration constant. For example, if $g_1(Z)=g_2(Z)+C$, where C is a constant, $g'_1(Z)=g'_2(Z)=g'(Z)$. Thus, different exposure functions offsetting by a constant can have the same first derivative. Typically, the set of images does not contain sufficient information for the determination of the integration constant for the absolute exposure function; and a relative exposure function is determined which may be offset from the absolute exposure function by a constant. In many situations, the relative exposure function is sufficient for the construction of an image from a set of images of different exposure durations.

Considered that the absolute exposure function is $g_a(Z)$ and the relative exposure function $g_r(Z)=g_a(Z)+C$. Since $$g_a(Z)=\ln E+\ln \Delta t,$$

the relative exposure function can be written as:

$$g_r(Z)=\ln E+\ln \Delta t+C=\ln E+\ln(k\Delta t)=\ln(kE)+\ln \Delta t$$

where $k=e^C$. Thus, the relative exposure function can be considered as scaling the irradiance or the exposure duration by a constant factor. Such a scaling is typically acceptable in the process of presenting an image. Thus, in some embodiments, integration constant may be selected to obtain a version of the relative exposure function.

For example, it may be assumed that, when $Z_0=(Z_{max}+Z_{min})/2$, $g_r(Z_0)=0$, where $Z_{max}$ and $Z_{min}$ are the upper and lower saturation pixel values. Thus, logarithm of the exposure function at the midpoint of the digital output range is calibrated at zero. Alternatively, other integration starting points can be used; and other selected points can be calibrated at a given value.

Once the exposure function (e.g., the relative exposure function) is obtained, a high dynamic range radiance map can be determined (235) using the exposure function.

$$\ln E=g(Z)-\ln \Delta t$$

Using the calculated exposure function g, the logarithm of the exposure can be calculated. The logarithm of the exposure subtracted by the logarithm of the exposure duration provides the logarithm of the irradiance. In one embodiment, radiance is assumed to be proportional to the irradiance; and the set of images taken with different exposure durations are used to compute the high dynamic radiance map that typically extends outside the range of a single image.

For example, an image taken with exposure duration $\Delta t_1$ provides the logarithm of irradiance at most in the range of $[g(Z_{min})-\ln \Delta t_1, g(Z_{max})-\ln \Delta t_1]$. From a set of images taken with exposure durations $\Delta t_1 < \Delta t_2 < ... < \Delta t$, the available range of the logarithm of irradiance can be expanded to the range of $[g(Z_{min})-\ln \Delta t, g(Z_{max})-\ln \Delta t_1]$.

The set of images typically have overlapping irradiance ranges. For example, the range of $[g(Z_{min})-\ln \Delta t_1, g(Z_{max})-\ln \Delta t_1]$ of an image with exposure duration $\Delta t_1$ overlaps with the range of $[g(Z_{min})-\ln \Delta t_2, g(Z_{max})-\ln \Delta t_2]$ of an image with exposure duration $\Delta t_2$, which overlaps with the range of $[g(Z_{min})-\ln \Delta t_3, g(Z_{max})-\ln \Delta t_3]$ of an image with exposure duration $\Delta t_3$, etc. In one embodiment, the irradiance values computed from non-saturated portions of the different images are averaged for improved accuracy.

When the relative exposure function $g_r$ is used, the relative irradiance $E_r$ is determined. Denote the absolute irradiance as $E_a$. Since $g_r(Z)=g_a(Z)+C$, we have $$\ln E_r=g_r(Z)-\ln \Delta t=g_a(Z)+C-\ln \Delta t=\ln E_a+C$$

Thus, $E_r=k E_a$ where $k=e^C$. Therefore, it is understood that the irradiance computed from the relative exposure function $g_r$ may be scaled by an unknown factor. Typically, the radiance data is scaled into a given range (e.g., the maximum allowable range) for an output device for presentation. Thus, such an unknown scaling factor is not of importance in many applications.

To determine the integration constant for the determination of the absolute exposure function, one or more data pairs for exposure and pixel value can be recorded when taking the set of images. When such data pairs are not available, a relative exposure function can be determined. In other case, the constant C is chosen such that the offset produced by C corresponds to offset existent in the exposure function for the middle exposure of the set. The middle exposure of the set is defined as having the closest index n/2, where n is the number of different exposure images.

In one embodiment of the present invention, the data points for the first derivative of the exposure function are used in a numerical integration scheme to generate the data points for the exposure functions.

Alternatively, the data points for the first derivative of the exposure function can be curve fit into an analytical expression, which can then be integrated to obtain the exposure function. In a typical curve-fitting scheme, the analytical expression is in terms of the linear combination of a set of known functions. The coefficients for the linear combination can be determined from minimizing the difference between the analytical expression and the set of data points in a curve fitting process. The integrals of the set of known functions are known. Thus, the integral of the analytical expression can be determined from a linear combination of the integrals of the set of known functions using the corresponding coefficients obtained from the curve fitting process.

Figure 6:
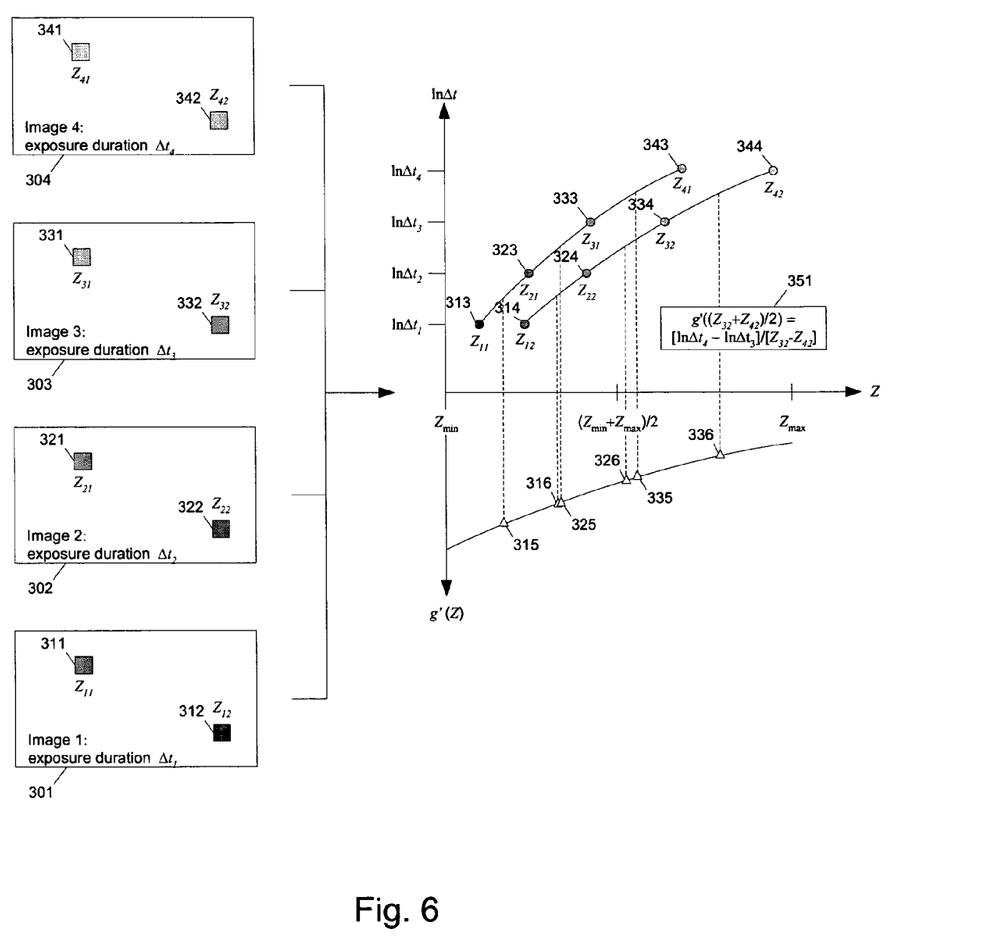
FIG. 6 illustrates an example of computing the first derivative of an exposure function for the determination of the exposure function according to one embodiment of the present invention.

FIG. 6 illustrates an example of computing the first derivative of an exposure function for the determination of the exposure function according to one embodiment of the present invention.

In one embodiment, a set of pixels can be identified as having the constant irradiance when the set of pixels have the same or approximately the same pixel values in one image. The average of the pixel values of the set of pixels in each image can be used as the average pixel value generated in imaging process for the image with the corresponding exposure duration. Thus, the averaged pixel values in different images can be used to compute the first derivative of the exposure function.

For example, in FIG. 6, a first set of pixels in the region (341) has an averaged pixel value $Z_{41}$ in the image (304), which has an exposure duration $\Delta t_4$. The first set of pixels has averaged pixel values $Z_{31}$, $Z_{21}$, $Z_{11}$ in the corresponding regions (331, 321, 311) in the images (303, 302, 301) of exposure durations $\Delta t_3$, $\Delta t_2$, $\Delta t_1$ respectively.

Similarly, a second set of pixels corresponding to regions (342, 332, 322, 312) in the images (304, 303, 302, 301) has averaged pixel values $Z_{42}$, $Z_{32}$, $Z_{22}$, $Z_{12}$ for exposure durations $\Delta t_4$ $\Delta t_3$, $\Delta t_2$, $\Delta t_1$ respectively.

Thus, the rates of the change in the logarithm of the exposure duration over the change in the averaged pixel values for the first and second sets of pixels can be individually evaluated, which correspond to the first derivate of the exposure function.

For example, in FIG. 6, the curve (313-323-333-343) shows the logarithm of the exposure duration (ln $\Delta t$) as a function of the pixel value (Z) for the first set of pixels; and the curve (314-324-334-344) shows the logarithm of the exposure duration (ln $\Delta t$) as a function of the pixel value (Z) for the first set of pixels.

Using a trapezoidal rule, the derivative of ln $\Delta t$ with respect to the pixel value (Z) under the condition of constant irradiance (E) can be computed, which is equal to the first derivative (g'(Z)) of the exposure function (g(Z)). For example, from the points (334 and 344), the derivative of the curve (314-324-334-344) at $Z=(Z_{32}+Z_{42})/2$ is computed as:

$$(\ln \Delta t_4 - \ln \Delta t_3)/(Z_{32}-Z_{42})$$

which corresponds to the point (336) on the curve for the first derivative (g'(Z)) of the exposure function (g(Z)).

Similarly, other points (315, 325, 335, 316, 326) of the curve for the first derivative (g'(Z)) can be determined from the corresponding pairs of points (313 and 323, 323 and 333, 333 and 343, 314 and 324, 324 and 334) and curves (313-323-333-343) and (314-324-334-344).

The data points on the curve for the first derivative (g'(Z)) can then be used to determine the exposure function g(z) using an integration process.

In certain areas of an image, the pixel values may have a large gradient, which indicates that the irradiance has a large gradient in these areas. Small variations in the positioning of the scene on the images may cause a same pixel to represent different points of the scene and to receive substantially different irradiances. To reduce error, it can be checked to determine if the pixel values of the set of pixels in each of the images are the same or approximately the same. If certain pixels have values that are outside a tolerant threshold (e.g., 2% or 5%) from the average value, the pixel values of these pixels can be excluded from the computation of the average value to improve the accuracy. Alternatively, these pixels may be excluded from the set of selected pixels; and the process can be repeated until the set of selected pixels have pixel values within a tolerant threshold from the average value in each of the images.

Further, a pixel with saturated values (e.g., $Z=Z_{max}$ or $Z=Z_{min}$) in an image may not provide the correct pixel value for the corresponding exposure. For the evaluation of the first derivative, an image that causes saturated pixel values in the set of pixels, which are identified as receiving the constant irradiance across the images, is excluded from the evaluation of the first derivative based on the set of pixels. Different sets of pixels may use different subsets of images in the computation of the first derivative of the exposure function to avoid using saturated values (or near saturated values, such as with 5% from the saturated values).

Typically, the exposure function is assumed to be a monotonic function. Thus, in one embodiment, data points falling out of a monotonic region are excluded from the computation of the first derivative of the exposure function.

In one embodiment of the present invention, the set of pixels are selected from a continuous block of pixels so that the set of pixels represents a continuous area of constant (or substantially constant) irradiance. In one embodiment, when the pixel values of a set of pixels are within a tolerance threshold (e.g., 5%) of the average value in one image (or in each of the images), the pixels are considered as receiving substantially constant irradiance. Alternatively, the set of pixels can be selected from separate regions. For example, the pixels can be binned according to the whether or not their pixel values are within a specified range in an image.

In one embodiment of the present invention, the first derivative of the exposure function is evaluated directly from the exposure durations of the image and the pixel values (or averages of pixel values). Alternatively, the first derivative of the exposure function can be evaluated indirectly. For example, the logarithm of the exposure duration as a function of the pixel values can be curve fit into an analytical expression; and the first derivative can then be evaluated based on the curve fit analytical expression.

In one embodiment of the present invention, the set of images are gray scale images; and the exposure function is derived from pixel gray scale levels.

In one embodiment of the present invention, the set of images are color images; the exposure function is evaluated according to gray scale levels. The pixels of substantially balanced red, green and blue components are selected for the evaluation of the exposure function. For example, the average of red, green and blue components of a pixel is used as the pixel value Z for the pixels that have the red, green and blue components within a tolerant threshold (e.g., 5%) from the average.

In one embodiment, assuming that different color components follow the same transfer function, exposure function derived from the gray scale values is used with the red, green and blue pixel values to evaluate the red, green and blue irradiance and to combine the red, green and blue irradiances from different images into one image.

In one embodiment, a high dynamic range (HDR) image represents pixel values for the red, green and blue channels in floating point numbers.

In one embodiment of the present invention, the individual exposure functions are derived for the red, green and blue channels. For example, the red component of the pixels can be used to derive the red exposure function; the blue component of the pixels can be used to derive the blue exposure function; and the green component of the pixels can be used to derive the green exposure function. Thus, the red, green and blue irradiances evaluated from different images using the corresponding red, green and blue exposure functions can be combined into one image.

Note that different integration constants for the red, green and blue exposure functions can leads to different white balance points, when the red, green and blue exposure functions are different. In one embodiment, the integration constants for the red, green and blue exposure functions are adjusted so that for a specific pixel value $Z_0$, the red, green and blue exposure functions ($g_r$, $g_g$, $g_b$) provide the same value $g_r(Z_0) = g_g(Z_0) = g_b(Z_0)$. For example, the integration constants may be calibrated so that $g_r(Z_0) = g_g(Z_0) = g_b(Z_0) = 0$ when $Z_0 = (Z_{max} + Z_{min})/2$. Thus, the set of exposure functions are such that a gray pixel ($Z_0$, $Z_0$, $Z_0$) in a red, green and blue color space is assumed to receiving equal red, green and blue irradiances. Note that equal red, green and blue irradiances are typically converted into a pixel of gray in a rendered image.

For a given pixel, the pixel values in n images taken with exposure durations $\Delta t_1$, $\Delta t_2$, ..., $\Delta t_n$ are $Z_1$, $Z_2$, ..., $Z_n$ respectively. Using the derived exposure function $g(Z)$, the logarithms of the irradiances can be computed as: $\ln E_1 = g(Z_1) - \ln \Delta t_1$, $\ln E_2 = g(Z_2) - \ln \Delta t_2$, ..., $\ln E_n = g(Z_n) - \ln \Delta t_n$. Typically, $\ln E_1$, $\ln E_2$, ..., $\ln E_n$ are different but close to the average value (e.g., $(\ln E_1 + \ln E_2 + ... + \ln E_n)/n$). Some of the pixel values may reach the saturation value (e.g., $Z_{min}$ or $Z_{max}$). The irradiances values computed based on the saturation value are not reliable and are excluded from computing the average value in one embodiment. Further, in one embodiment, if one of $\ln E_1$, $\ln E_2$, ..., $\ln E_n$ is a tolerant threshold (e.g., %5) away from the average value, it may be excluded from computing the average value to improve the accuracy.

Further, in one embodiment, the irradiances computed from different images are weighted according to their pixel values. It may be assumed that the middle portion of the exposure curve is more accurate that the portions of exposure curve that are close to the saturated values (e.g., $Z_{min}$ and $Z_{max}$). Thus, in one embodiment, the irradiance computed using the middle portion of the exposure curve carries more weight than the irradiance computed from the end portions of the exposure curve.

For example, in one embodiment, the average irradiance value is obtained from:

$$E_0 = \{\Sigma_{i=1}^n [E_i \times |Z_i - Z_0|^m]\} / \Sigma_{i=1}^n |Z_i - Z_0|^m$$

where $Z_0 = (Z_{max} + Z_{min})/2$; and the parameter m can be an integer such as 0, 1, .... In the above expression, the irradiance values $E_i$ (i=1, 2, ..., n) are weighted according to the distance of the corresponding pixel value $Z_i$ to the center of the pixel value range, $Z_0$. When m=0, different pixels are weighted evenly. As the parameter m increases, the weight on the middle portion becomes heavier than the weight on the end portions of the exposure curve.

Figure 5:
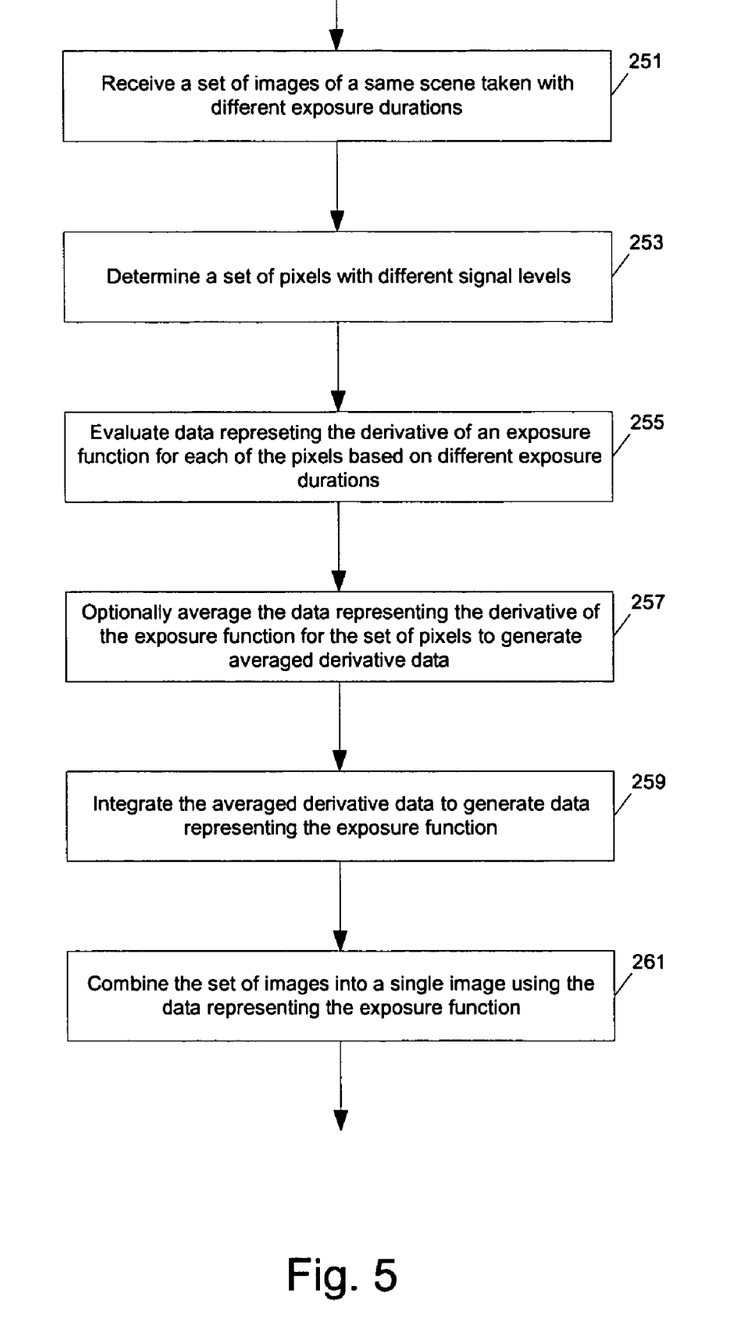
FIG. 5 illustrates a method to combine a set of images of different exposure durations according to one embodiment of the present invention.

FIG. 5 illustrates a method to combine a set of images of different exposure durations according to one embodiment of the present invention. Operation 251 receives a set of images of a same scene taken with different exposure durations. The same pixel in each of the set of images corresponds to the same area of the scene captured at different exposure durations. Operation 253 determines a set of pixels with different signal levels. Alternatively, a set of pixel groups or pixel blocks with different signal levels can be determined. Operation 255 evaluates data representing the derivative of an exposure function for each of the pixels based on different exposure durations. For example, the derivative of the exposure duration with respect to signal levels for each of the set of pixels (or pixel groups or pixel blocks) can be computed as the derivative of an exposure function. Operation 257 optionally averages the data representing the derivative of the exposure function for the set of pixels to generate averaged derivative data. Operation 259 integrates the averaged derivative data to generate data representing the exposure function. In one embodiment, the first derivative of the exposure function evaluated from different pixel (or pixel group or pixel block) is supported at different signal levels. A direct numerical integration scheme (e.g., trapezoidal rule) can be used obtain the data points for the exposure function, which can be interpolated or curved fit as a function. Alternatively, the data representing the derivative of the exposure function can be curve fit for integration. Operation 261 combines the set of images into a single image using the data representing the exposure function. For example, the irradiance data computed using the exposure function according to non-saturated pixel values can be used to determine pixel values of a high dynamic range image.

Many of the methods of the present invention may be performed with a digital processing system, such as a conventional, general-purpose computer system. Special purpose computers, which are designed or programmed to perform only one function, may also be used.

Figure 1:
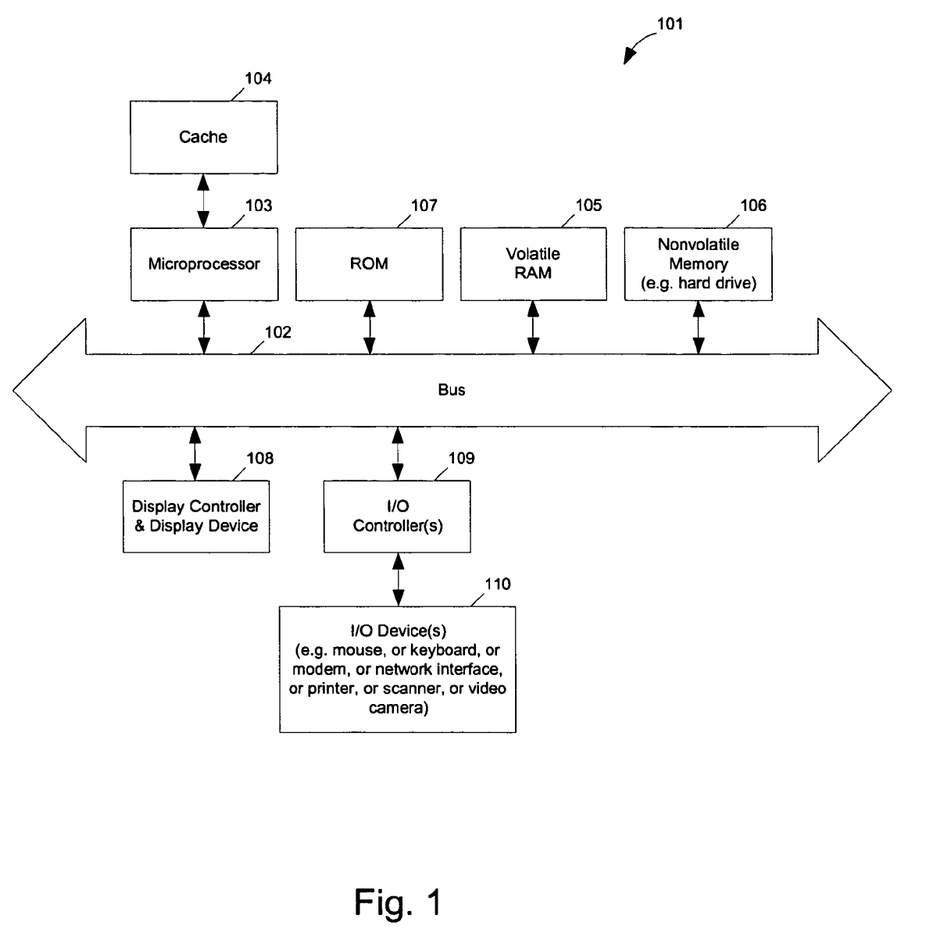
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3, G4, or G5 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Figure 2:
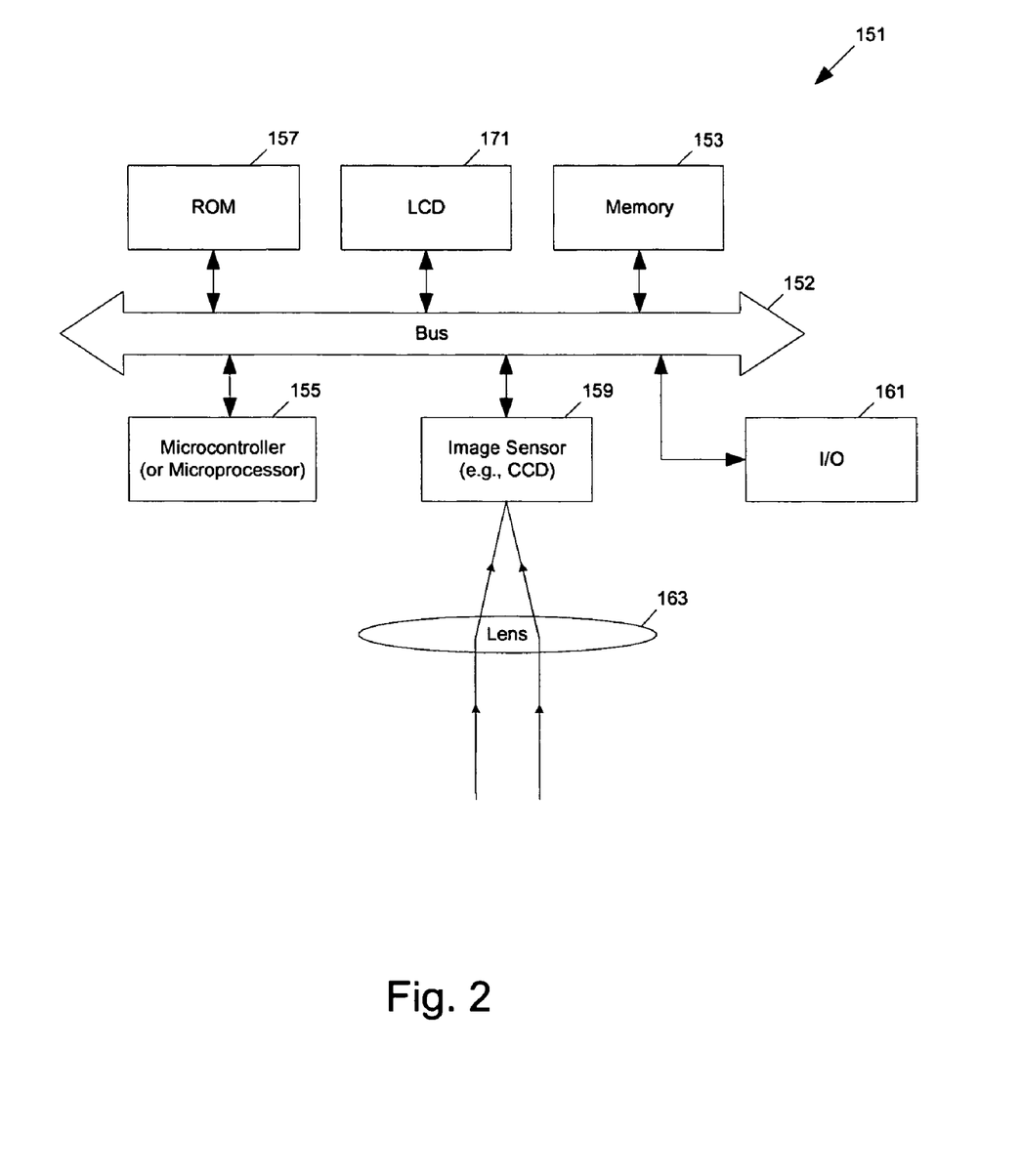
FIG. 2 shows an example of an image taking system which may be used in embodiments of the invention.

FIG. 2 shows an example of an image taking system which may be used in embodiments of the invention. This imaging device 151 may be, for example, a digital still or video (movie) camera. The imaging device 151 includes a microcontroller or microprocessor 155 which is coupled by a bus 152 to a memory 153, an Input/Output (I/O) port 161, a CCD (Charge Coupled Device) image sensor 159, and a ROM (Read Only Memory) 157. The imaging device 151 may also include a Liquid Crystal Display (LCD) 171, which is also coupled to the bus 152 and which may be used to display images which are captured or recorded by the imaging device 151. The LCD 171 serves as a viewfinder of a camera and there may optionally be other types of image display devices on imaging device 151 which can serve as a viewfinder.

The imaging device 151 also includes an imaging lens 163 which can be disposed over CCD 159. The microprocessor 155 controls the operation of the imaging device 151; and, it may do so by executing a software program stored in ROM 157, or in the microprocessor 155, or in both ROM 157 and the microprocessor 155.

The microprocessor 155 controls the image processing operation; and, it controls the storage of a captured image in memory 153. The microprocessor 155 also controls the exporting of image data (which may or may not be color corrected) to an external general purpose computer or special purpose computer through one of the I/O ports 161.

The microprocessor 155 also responds to user commands (e.g., a command to "take" a picture by capturing an image on the CCD and storing it in memory or a command to select an option for contrast enhancement and color balance adjustment).

The ROM 157 may store software instructions for execution by the microprocessor 155 to derive the exposure function and generate high dynamic range images from series of images with different exposure duration. The memory 153 is used to store captured/recorded images which are received from the CCD 159. It will be appreciated that other alternative architectures of a camera can be used with the various embodiments of the invention.

In one embodiment, the imaging device 151 has a housing (not shown in FIG. 2) and the lens 163 and LCD 171 are coupled to the housing. The microcontroller 155 and image sensor 159 are enclosed within the housing. In one embodiment, the ROM 157 and memory 153 are also enclosed within the housing.

In one embodiment, when the imaging device 151 is instructed to capture a high dynamic range image of a scene, a set of images are taken automatically with a number of different exposure durations. The microcontroller (155) then derives the exposure function for the set of images and combines the set of images into a high dynamic range image. In certain embodiments, one or more methods described herein may be used in a scanner or in processing images from a scanner.

The methods of the present invention can be implemented using dedicated hardware (e.g., using Field Programmable Gate Arrays, or Application Specific Integrated Circuit, which many be integrated with image sensors, such as CCD or CMOS based image sensors) or shared circuitry (e.g., microprocessors or microcontrollers under control of program instructions stored in a machine readable medium, such as memory chips) for an imaging device, such as system 151 in FIG. 2. The methods of the present invention can also be implemented as computer instructions for execution on a data processing system, such as system 101 of FIG. 1.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable storage medium storing executable computer program instructions which when executed by a data processing system cause said system to perform a method for high dynamic range imaging, the method comprising:
    evaluating first data representing a derivative of an exposure function from pixel values of a plurality of images taken with a plurality of exposure durations respectively, wherein at least some of the pixel values represent a region receiving substantially constant irradiance in the plurality of images; and
    integrating the first data to generate second data representing the exposure function.

2. The medium of claim 1, further comprising:
    combining the plurality of images into a high dynamic range (HDR) image using the exposure function.

3. The medium of claim 2, wherein for the images the exposure function indicates variation in exposure with respect to pixel value level produced at corresponding exposure.

4. The medium of claim 3, wherein said combining comprises:
    averaging data representing irradiance evaluated according to the pixel values of the plurality of images and the second data.

5. The medium of claim 4, wherein the data representing irradiance is averaged using weight based on the pixel values.

6. The medium of claim 2, wherein said evaluating comprises:
    computing the first data from data representing a derivative of logarithm of exposure duration with respect to pixel value for one or more pixels in a region receiving substantially constant irradiance in the plurality of images.

7. The medium of claim 6, wherein the one or more pixels comprise a contiguous block of pixels.

8. The medium of claim 7, wherein the block of pixels have pixel values within a tolerant threshold from an average of pixel values of the block of pixels.

9. The medium of claim 2, wherein said evaluating comprises:
    computing a rate of change in logarithm of exposure duration over change in pixel value one or more pixels representing a region receiving substantially constant irradiance in the plurality of images.

10. The medium of claim 2, wherein said evaluating comprises:
    evaluating a rate of exposure duration change over a product of exposure duration and pixel value change for the plurality of images.

11. The medium of claim 10, wherein the rate is evaluated for one or more pixels representing a region receiving substantially constant irradiance in the plurality of images.

12. The medium of claim 2, wherein the exposure function is evaluated from pixel values for one of:
    a red channel;
    a green channel; and
    a blue channel.

13. The medium of claim 2, wherein the exposure function is evaluated from pixel values for a gray level.

14. A method of image processing, the method comprising:
    evaluating first data representing a derivative of an exposure function from pixel values of a plurality of images of a scene taken with a plurality of exposure durations, wherein at least some of the pixel values represent a region receiving substantially constant irradiance in the plurality of images;
    integrating the first data to generate second data representing the exposure function; and
    generating an image, for display on a display device, of the scene from the plurality of images and the second data representing the exposure function.

15. The method of claim 14, wherein the image of the scene is generated from averaging data representing irradiance evaluated according to the pixel values of the plurality of images and the second data; and wherein the data representing irradiance is averaged using weight based on the pixel values.

16. The method of claim 14, wherein said evaluating comprises:
    computing the first data from data representing a derivative of logarithm of exposure duration with respect to pixel value for one or more pixels.

17. A data processing system for image processing, the data processing system comprising:
    means for evaluating first data representing a derivative of an exposure function from pixel values of a plurality of images of a scene taken with a plurality of exposure durations, wherein at least some of the pixel values represent a region receiving substantially constant irradiance in the plurality of images; and
    means for integrating the first data to generate second data representing the exposure function.

18. The data processing system of claim 17, wherein for the images the exposure function represents a logarithm of exposure as a function of pixel value level produced at corresponding exposure.

19. The data processing system of claim 17, further comprising:
    means for generate an image of the scene from the plurality of images and the second data representing the exposure function through averaging data representing irradiance evaluated according to the pixel values of the plurality of images and the second data.

20. The data processing system of claim 19, wherein the data representing irradiance is averaged using weight based on the pixel values; and the weight is larger for pixel values closer to saturated pixel values than for pixel values away from the saturated pixel values.

21. The data processing system of claim 17, wherein said means for evaluating comprises:
    means for computing the first data from data representing a derivative of logarithm of exposure duration with respect to pixel value for one or more pixels in a region receiving substantially constant irradiance in the plurality of images.

22. The data processing system of claim 21, wherein said means for evaluating comprises:
    means for selecting the one or more pixels based on pixel values in the plurality of images.

23. An image capturing device, comprising:
    memory;
    an image sensing device coupled to the memory to generate a plurality of images of a scene with a plurality of exposure durations; and a processing circuit coupled to the image sensing device, the processing circuit to compute an exposure function from the plurality of images and combine the plurality of images into a high dynamic range (HDR) image using the exposure function, wherein to compute the exposure function the processing circuit is to:

evaluate first data representing a derivative of the exposure function from pixel values of the plurality of images and the plurality of exposure durations, wherein at least some of the pixel values represent a region receiving substantially constant irradiance in the plurality of images; and integrate the first data to generate second data representing the exposure function.

24. The device of claim 23, wherein the first data represents logarithm of exposure as a function of pixel value.

25. The device of claim 23, wherein for the images the exposure function indicates variation in exposure with respect to pixel value level produced at corresponding exposure; and the HDR image of the scene is generated from averaging data representing irradiance evaluated according to the pixel values of the plurality of images and the second data.

26. The device of claim 25, wherein the data representing irradiance is averaged using weight based on the pixel values; and wherein the weight for pixel values near saturated values is smaller than for pixel values away from the saturated values.

27. The device of claim 23, further comprising:
a housing; and
a lens coupled to the housing;
wherein the processing circuit and the image sensing device are enclosed within the housing.

28. A machine readable storage medium storing executable computer program instructions which when executed by a data processing system cause said system to perform a method for high dynamic range imaging, the method comprising:

receiving a plurality of images taken with a plurality of exposure durations respectively;

determining differences in exposure durations with respect to differences in pixel values of the plurality images to evaluate an exposure function; and determining an irradiance map from the plurality of images using the exposure function, wherein said determining differences in exposure durations with respect to differences in pixel values of the plurality images comprises:

determining a ratio between a difference in logarithm of two exposure durations and a difference in pixel values in two of the plurality of images taken with the two exposure durations respectively.

29. The medium of claim 28, wherein said determining differences in exposure durations with respect to differences in pixel values of the plurality images comprises:

determining a ratio between a difference in two exposure durations and a product of a combination of two pixel values and a difference in pixel values in the pixel values, the pixel values corresponding to a point of a scene in two of the plurality of images taken with the two exposure durations respectively.

30. A machine readable storage medium storing executable computer program instructions which when executed by a data processing system cause said system to perform a method for high dynamic range imaging, the method comprising:

receiving a plurality of images taken with a plurality of exposure durations respectively;

determining an exposure function from mathematically integrating a slope curve of the exposure function derived from the plurality of images and the plurality of exposure durations; and recovering a high dynamic range (HDR) image from the plurality of images and the plurality of exposure duration using the exposure function.

31. The medium of claim 30, wherein the high dynamic range image comprises an irradiance map.

32. The medium of claim 30, wherein the high dynamic range image has a dynamic range larger than any of the plurality of images.

33. An image capturing device comprising:
a memory;
an image sensing device coupled to the memory to generate a plurality of images with a plurality of exposure durations; and
a processing circuit coupled to the image sensing device, the processing circuit configured to
determine an exposure function from a mathematical integration of a slope curve of the exposure function derived from the plurality of images and the plurality of exposure durations; and
recover a high dynamic range (HDR) image from the plurality of images using the exposure function.

34. The image capturing device of claim 33, wherein the plurality of exposure durations comprise a set of images having different exposure durations,
wherein the plurality of images each include a common scene, and
wherein the HDR image has a dynamic range larger than any of the plurality of images.

* * * * *

UNITED STATES PATENT AND TRADEMARK OFFICE
CERTIFICATE OF CORRECTION

| | | |
|---|---|---|
| PATENT NO. | : 7,626,614 B1 | Page 1 of 1 |
| APPLICATION NO. | : 11/058770 | |
| DATED | : December 1, 2009 | |
| INVENTOR(S) | : Gabriel G. Marcu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1196 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,626,614 B1 | Page 1 of 1 |
| APPLICATION NO. | : 11/058770 | |
| DATED | : December 1, 2009 | |
| INVENTOR(S) | : Marcu | |

It is certified that error appears in the above-identified patent and that said Letters Patent is hereby corrected as shown below:

In Drawings
On Sheet 5 of 6, in Figure 5, in Reference Numeral 255, line 1, delete "represeting" and insert -- representing --, therefor.

In column 14, line 42, in Claim 19, delete "generate" and insert -- generating --, therefor.

In column 16, line 37, in Claim 33, after "to" insert -- : --.

Signed and Sealed this
Eleventh Day of October, 2011

David J. Kappos
*Director of the United States Patent and Trademark Office*